United States Patent [19]

Ryan

[11] Patent Number: 5,524,051

[45] Date of Patent: Jun. 4, 1996

[54] METHOD AND SYSTEM FOR AUDIO INFORMATION DISSEMINATION USING VARIOUS MODES OF TRANSMISSION

[75] Inventor: John O. Ryan, Cupertino, Calif.

[73] Assignee: Command Audio Corporation, Sunnyvale, Calif.

[21] Appl. No.: 223,641

[22] Filed: Apr. 6, 1994

[51] Int. Cl.$^6$ .................................. H04L 9/00; H04B 1/06
[52] U.S. Cl. .................................. 380/9; 380/49; 380/50; 455/45; 381/34
[58] Field of Search .................... 455/151.1, 151.2, 455/151.4, 186.1; 381/29, 30, 34, 59, 110; 348/473; 379/88; 380/4, 9, 19, 20, 49, 50

[56] References Cited

U.S. PATENT DOCUMENTS

| | | | |
|---|---|---|---|
| 4,266,243 | 5/1981 | Shutterly | 380/19 |
| 4,393,277 | 7/1983 | Besen et al. | 379/88 |
| 4,473,824 | 9/1984 | Claytor | 340/825.27 |
| 4,682,368 | 7/1987 | Takahashi | 455/38.1 |
| 4,788,543 | 11/1988 | Rubin | 340/825.44 |
| 5,042,070 | 8/1991 | Linna et al. | 381/59 |
| 5,210,611 | 5/1993 | Yee et al. | 348/473 |

FOREIGN PATENT DOCUMENTS

| | | | |
|---|---|---|---|
| 0128093 | 12/1984 | European Pat. Off. | H04N 7/08 |
| 0552051 | 7/1993 | European Pat. Off. | H04M 3/50 |
| 2651352 | 3/1991 | France | G08G 1/096 |
| WO8704309 | 7/1987 | WIPO | H04B 7/00 |

*Primary Examiner*—Bernarr E. Gregory
*Attorney, Agent, or Firm*—Gerow D. Brill

[57] ABSTRACT

A system and method of information dissemination that permits the user to listen to the specific content of information when and where he or she wants to. A radio or television receiver system receives information from an FM subcarrier, a television vertical blanking interval transmission, an active picture area television transmission a television separate audio program transmission or a dedicated radio channel and stores the transmitted information in a memory. A user interface allows selection from the memory of the stored information via a set of menus controlling a hierarchical database, so as to access particular items of the information. Typically the system includes RAM and/or a magnetic storage medium such as a digital audio tape, a magneto-optical mini-disk, a magnetic disk or optical disk, sufficient to store information for several hours of audio output. A decompression device accepts the accessed compressed digital audio information items and transforms them into audible speech signals. The user interface is either a voice control or a single or multi-position switch allowing scanning through and selection from the menu items. The system is also capable of transmitting alphanumeric data and converting this alphanumeric data to an audible form using a voice synthesizer.

47 Claims, 4 Drawing Sheets

METHOD AND SYSTEM FOR AUDIO INFORMATION DISSEMINATION USING VARIOUS MODES OF TRANSMISSION

CROSS REFERENCE TO RELATED APPLICATION

This invention is related to a copending commonly owned application Ser. No. 08/181394, filed Jan. 12, 1994 entitled A METHOD AND SYSTEM FOR INFORMATION DISSEMINATION USING VARIOUS MODES OF TRANSMISSION by John O. Ryan which is a Continuation-in-Part of application Ser. No. 08/031,763, filed Mar. 15, 1993 entitled RADIO RECEIVER FOR INFORMATION DISSEMINATION USING SUBCARRIER BY John O. Ryan, now U.S. Pat. No. 4,706,620.

BACKGROUND

1. Field of Invention

This invention relates to a radio or television broadcasting system for transmission of audio and text information and more specially to transmitting digitized audio data and text data.

2. Description of the Prior Art

Numerous systems transmit information on FM radio subcarriers. See for instance, U.S. Pat. No. 5,152,011 issued to Schwob, Sep. 29, 1992. Also known is a single sideband communication system with FM data capability for transmission of analog voice signals. See U.S. Pat. No. 4,852,086 issued to EastmoLd et al., Jul. 20, 1989.

Also known is FM radio sideband broadcasting to specially adapted computers for transmission for instance of news and financial information. Commercially available products available from Mainstream, Telemet, and DeskTop Data broadcast data over FM radio sidebands for receipt by personal computers equipped with special FM radio receivers and software. Typically information is transmitted in digital form, received, and stored in the computer memory for access by the computer user using menu driven software, The data is displayed on the computer screen in conventional alphanumeric form. One product in this category is News Edge, a news service available from DeskTop Data, Inc. of Waltham, Mass. which delivers a number of news and financial information services to a user via FM radio sideband. Software provided with the product scans incoming information and when the incoming information meets parameters set by the user, the information is saved to disk and/or displayed on the computer screen.

These systems have the disadvantage of requiring a personal computer as a platform, and providing information only on a computer screen. The usual computer skills are needed in order to operate such systems, which tend to be quite expensive.

Data can also be transmitted in the Vertical Blanking Interval of a television transmission. The Federal Communications Commission has set aside several lines of the Vertical Blanking Interval for point to multipoint data transmission which may be sold to interested users.

In addition to using the Vertical Blanking Interval, data can be transmitted via a television channel using 384 Kpbs transmission system during the active video portion of the television channel using a system available from WavePhore, Inc. This system piggybacks digital data within the active area of an existing broadcast signal, without interfering with the regular television picture. The decoded data can include text and sound.

An additional channel of communication for data or audio transmission is the Separate Audio Program channel available in television broadcasting.

All of these systems have the disadvantage that the listener or user of the data is restricted to a specific place or time to access the information. The portable radio, be it hand held or in an automobile, also limits the user to accessing only the information that is presently being transmitted.

SUMMARY

The present system and method permits the user to listen to a specific news or information item when and where he or she wants to. The present invention is directed to a method and system for information dissemination using various modes of transmission and that satisfies the individual needs of such a user. The invention includes a system for receiving information via a tuner that extracts digitized alphanumeric data and/or compressed audio data from the Vertical Blanking Interval of a television station's video signal, the active television picture area using the WavePhore system, the Separate Audio Program (SAP) signal from a television station's audio signal, or a system for receiving the digitized alphanumeric data or compressed audio information via radio sidebands (subcarriers) which include an FM subcarrier of an FM broadcast signal. In addition, a suitable dedicated transmission facility may be provided. Conditional access circuitry in the receiver decrypts the previously encrypted digitized alphanumeric data or compressed audio data which is then stored as a database in a memory. A user interface (for instance either a simple manual switch or voice activated control) driving a hierarchy of menus allows the user to access the information by indicating his selections from the menus. The system then extracts the information from the database. A speech producing device including a decompression system and a digital to analog converter (D/A) or other speech producing device converts the extracted data to an audio signal for provision to the user via a loud speaker or earphones.

This system may be stand alone or be a part of an existing radio receiver, sharing components of the radio receiver. One embodiment of the user interface is a four way switch (the positions corresponding for instance to the cursor control keys on a computer) for selection from and scanning through menus listing various categories of information. Typically the system includes either volatile or non-volatile RAM (random access memory) or a non-volatile storage medium such as a digital audio tape, a magneto-optical mini-disk, a magnetic disk or optical disk, sufficient to store information e.g. for a few hours of audio. The information is for example news, sports, weather, cultural information, advertisements, commercial listings or music. The information is transmitted in encrypted digital form using data compression techniques. The use of encryption techniques controls access to the information data base as a whole or to selected parts that the user has contracted for.

Another feature is a channel skipping tuner for finding the particular FM radio station subcarrier, TV station vertical blanking interval, active TV picture area channel or TV station SAP channel on which the service is provided. The speech producing device may be under either automatic or user control to produce different speeds of the audio output. This control of the speed of the audio may change the pitch or change the spacing between words. Also, the user has the opportunity to preselect database items, thereby to construct a personal profile so as to extract particular information without having to scan through all the menus.

BRIEF DESCRIPTION OF THE DRAWING

These and other features and other aspects of the present invention will become better understood with reference to the following description, appended claims and accompanying drawings where:

DETAILED DESCRIPTION

Figure 1:
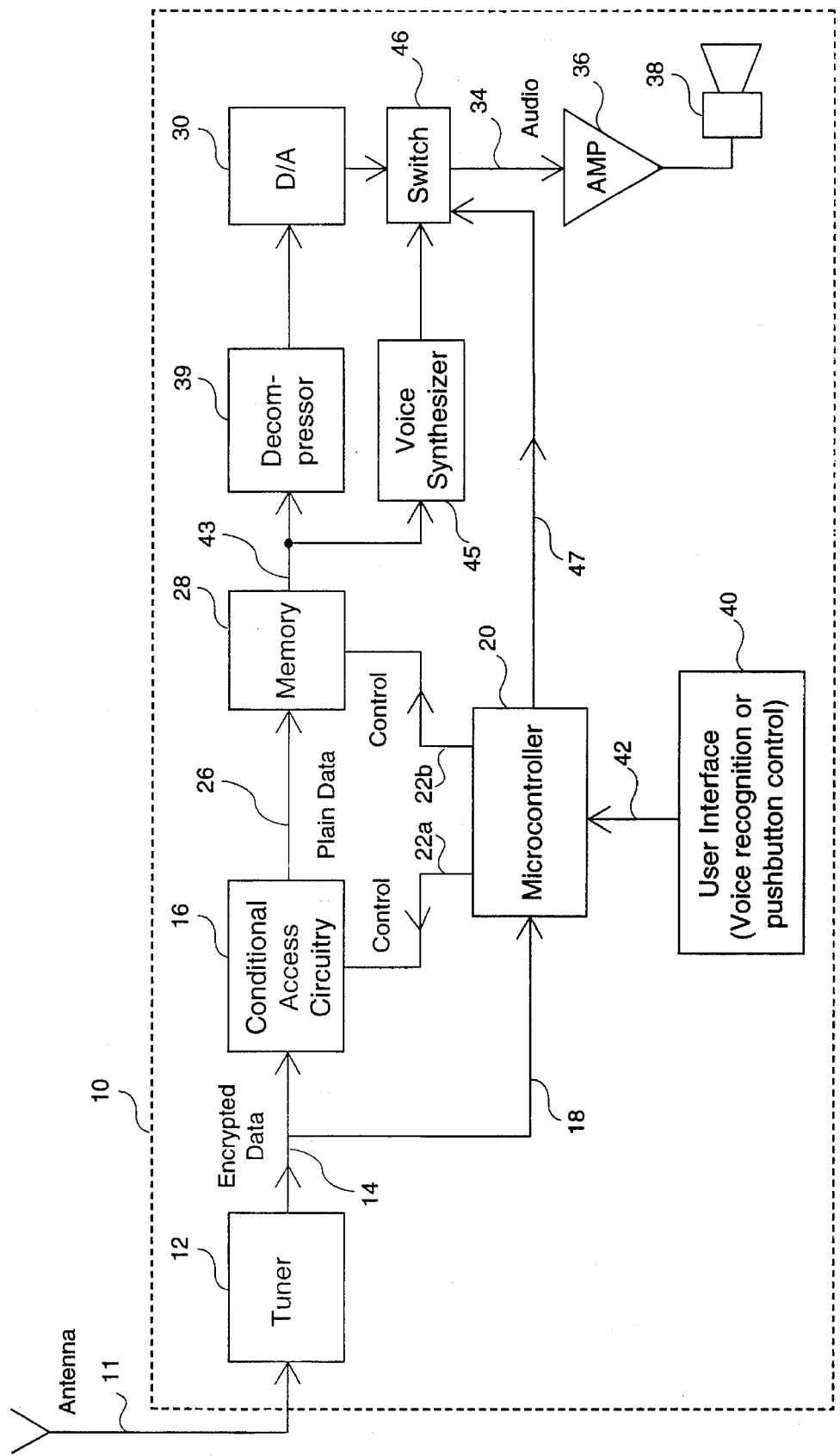
FIG. 1 shows a block diagram of a receiving apparatus in accordance with the present invention.

FIG. 1 shows a receiving apparatus 10 in accordance with one embodiment of the invention. A broadcast signal is received from an antenna 11 (as used in automobile or portable applications) which provides a received radio broadcast signal or television broadcast signal to a tuner 12. Each audio data item is "tagged" with a designation to allow retrieval of the stored encrypted audio data from the database. Tuner 12 is either an FM Subcarrier tuner of the type well known in the art for extracting an FM broadcast subcarrier signal; a television tuner designed to produce the output of the Vertical Blanking Interval, or active picture area or of a Separate Audio Program channel from a television broadcast signal; or a dedicated radio channel tuner. In the case of an FM subcarrier tuners as is well known, the subcarrier signals are typically transmissions of digitized data on subcarriers leased from commercial FM stations. The Vertical Blanking Interval is already available for point to multipoint transmission. As discussed above, the active picture area of a television transmission can be used using the WavePhore system. The tuner 12 provides on line 14 the extracted digitized audio data (which is typically encrypted) to conditional access circuitry 16 and to microcontroller (controller) 20 (described below) on line 18.

Conditional access circuitry 16 ensures that the encrypted data on line 14 is decrypted only if the proper key or command has been provided, as described below. Conditional access circuitry 16 decrypts the received data (as authorized by microcontroller 20 over line 22a) and provides same on line 26 as plain (decrypted data) for storage to the memory 28 which may be conventional integrated circuit random access memory (RAM). Memory 28 may be volatile or non-volatile integrated circuit (random access memory), Memory 28 may include a nonvolatile storage medium such as a digital audio tape, a magneto-optical mini-disk, a magnetic disk or an optical disk, with sufficient capacity to store information for several hours of audio output data.

Figure 2:
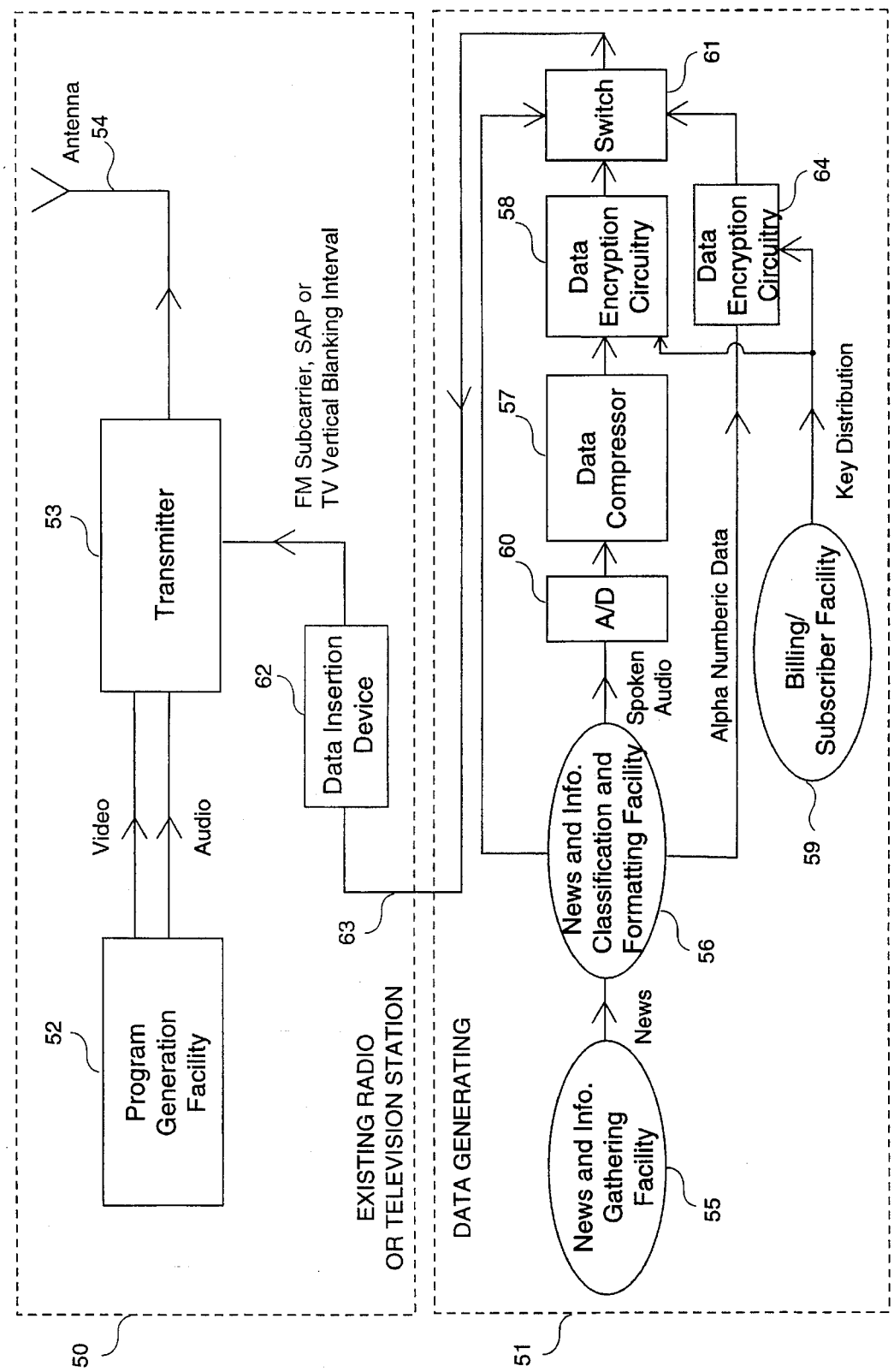
FIG. 2 shows a block diagram of a transmission system in accordance with the present invention.

In order to provide the needed quantity of audio data in a minimum time frame, to minimize bandwidth requirements and to minimize the memory requirement, the original audio data is one embodiment subject to a data compression algorithm at the transmitter to compress the data sufficiently. (This data compression circuitry as shown in FIG. 2 is discussed later.) The receiving apparatus 10 includes a companion decompression algorithm in the decompression circuitry 39, connected to the output of memory 28 by line 43 to provide the decompressed data to the digital to analog converter 30 for conversion of the digitized data to analog audio signals.

The conditional access circuitry 16 and microcontroller 20 are further described below. The decrypted compressed data output of the memory 28 is accessed under control of microcontroller (microprocessor) 20 via control signals at line 22b, to determine which particular items of data stored in memory 28 are to be provided via output line 43 to the decompression circuitry 39.

Some of the data that a user uses in such a system may be in alphanumeric form that can be easily transmitted in that form and converted to audio at the receiver via speech synthesis. Such data is transmitted in alphanumeric form for bandwidth, speed and memory conservation considerations. In order to accommodate the dual transmission of alphanumeric data as well as audio data, switch 46 controlled by microcontroller 20 on line 47 determines whether the currently accessed data is in the form of originally alphanumeric data or compressed audio data. When originally alphanumeric data is being accessed, the alphanumeric data is provided via line 43 to a speech (voice) synthesizer 45 whose audio output is connected to switch 46 for connection to conventional audio amplifier 36 and loudspeaker or earphone 38.

User interface 40 inputs commands on line 42 to microcontroller 20 to determine which data from memory 28 are to be accessed. The information is categorized, stored, and accessed as a conventional hierarchial database stored in memory 28 under control of microcontroller 20. User interface 40 (either a simple manual or voice control) driving a hierarchy of menus allows a user to access the information by indicating his selections from the menus.

In one embodiment user interface 40 is a voice activated command system. For instance the device is turned on and initialized by the user's spoken "ON" command. It then responds by audibly announcing via loud speaker 38 the major database categories available e.g. "NEWS", "SPORTS", "ENTERTAINMENT", etc. When the desired category has been announced, the user responds by saying "YES". The device then announces again the sub-categories of the selected major category, and the user again selects the desired sub-category with a spoken "YES" until the specific item needed is accessed. For example, the category and sub-category path to the latest news regarding the General Motors Corporation might be "NEWS . . . BUSINESS . . . NATIONAL . . . AUTOMOTIVE . . . GM."0 The path to a review of the recent movie Aladdin might be "ENTERTAINMENT . . . HOLLYWOOD . . . MOVIE REVIEWS . . . ALADDIN." Typically items will be reached after four or five "YES" responses from the user. In one embodiment three additional spoken commands by the user such as "BACK" "STOP" and "GO" are sufficient to provide the user effective and rapid control of the system.

In another embodiment, a manual input device such as a switch assembly having for instance four positions (up, down, left, right) corresponding to the familiar cursor control on a computer, with each position indicating one of four commands, is provided for user manual operation. This switch may be adapted to attach to the steering wheel of an automobile, for use by the driver. The control is linked to the rest of the receiver apparatus 10 by wire, infrared, or ultrasonically, as is a conventional television remote control.

Another version of the user interface 40 includes a one-position control switch. The user briefly depresses the switch to select the category or item as announced or to scan through the menus. Briefly depressing the switch while an actual data item is being read executes "stop." Depressing it again then executes "go." Holding the switch down for e.g. a second or two executes "back" at any time, to return to a predetermined point in the database.

For full effectiveness the receiver apparatus 10 may be at least partly powered on 24 hours a day. In order to conserve power the received data may be first stored in random access memory (RAM) which is a part of memory 28 which consumes little power and when the RAM is full, transferred to a storage medium such as a digital audio tape, a magneto-optical mini-disk, a magnetic disk or an optical disk. Tuner 12, microcontroller 20, conditional access circuitry 16 and memory 28 are the elements that typically remain powered on at all times (by battery power if necessary) to receive a continuous update of the broadcast information, and thereby to store current data in memory 28.

When using the Vertical Blanking Interval to transmit data, it is possible to transmit at a rate of 2 megabits per second on 6 consecutive Vertical Blanking Interval lines each with a 50 microseconds duration to provide a 24,000 bit per second channel with a 50% error correction overhead.

In one version the receiver apparatus 10 of FIG. 1 is a portable unit (similar to a portable radio) and includes in the housing the user voice or manual interface 40. In another embodiment the receiver apparatus of FIG. 1 is built into a conventional portable radio or automobile radio, sharing where possible common components and where appropriate a separate user interface 40.

In one embodiment user interface 40 includes a speed control to determine the output speed of speech output. The digital to analog converter 30 or the voice synthesizer 45 may receive data faster than normal speaking speed. It is well known that people can understand speech at faster than normal speech rates. Thus the user interface 40, increases the speech speed as described above, so as to obtain information faster, analogous to skimming printed material. This speeding up can use well known techniques that change the pitch or eliminate the gaps between words. A similar slowing down approach can be used in case the user wants to carefully note what is being said, for example while taking notes.

In the embodiment using a voice activated user interface 40, the number of commands provided is typically limited (for instance to 5 to 10) and hence a relatively simple commercially available voice input recognition circuit is sufficient.

In another embodiments the user interface for an automobile-based system is associated with a heads-up display, expected to be available in various automobiles in the near future. This provides visual display of the database menus analogous to a computer screen, to allow faster access to the database menus.

Advantageously, by transmitting and storing the audio data in a compressed form (even though encrypted), the required bandwidth of the transmission channel is vastly reduced, as are the requirements of memory 28, thereby substantially reducing the component cost of memory 28. When used in FM subcarrier transmission, the typical transmission speed is one kilobaud. In an SAP channel, the typical speed of transmission is 15 kilobaud.

In use, after acquisition of the receiving apparatus 10, the user programs it to the frequencies of the local stations providing the transmissions. There may be multiple such stations in one area, due to the limited transmission distance of FM radio and TV signals. A channel skipping feature (as is now available commercially in various radios) in one embodiment included in microcontroller 20 seeks out stations having a particular signature or frequency, to maintain reception even when moving from the transmission area of one station carrying the service to the transmission area of a second station carrying the service. It will take less than a minute for the system to scan the entire FM band or TV band looking for the signature transmission.

The data decryption/access of block 16 is accomplished in several alternate ways. In one embodiment a simple addressed on/off command is transmitted (without data encryption) to disable individual receiver apparatuses belonging to users who have not paid the required (e.g. monthly) subscription fee to receive the service. The decryption can be used to provide access to the entire data base or to individual parts of the data base depending on what the user has paid for.

In an alternate more sophisticated decryption system where it is believed there is a problem of manufacture and sale of unauthorized receiver units, proper data encryption is used, requiring receipt of a key and decryption of the received data with decryption circuitry in block 16. Hence unauthorized receiver units without such dedicated decryption circuitry will not be operative at all.

In one embodiment of a decryption system, (analogous to pay-per-view cable TV encryption), decryption keys are delivered by radio transmission. Each individual receiver unit has a unique "hidden" key of for instance 40 to 50 binary digits in read only memory. Each unit also has a "public" non hidden serial number. All transmitted data is conventionally encrypted using a master key which is changed periodically to enhance security. Each receiver unit receives a master key to decrypt the data transmission.

The master key is transmitted to each unit as follows:

Periodically, the broadcast transmission of the data is interrupted to transmit key information. The key information is a series of packets, one packet for each individual receiver unit, with each packet including (1) an address field which is the public serial number of a particular receiver unit; followed by (2) a second field which is the current master key encrypted with the unique "hidden key" of the receiver unit having that particular serial number.

The receiver units look for these packets (which are denoted by a particular signature or occur at particular times to avoid confusion with the data). When a particular receiver unit receives the packet including its own address (public serial number), it stores and decrypts the subsequent encrypted master key field, thereby obtaining the master key, in order to decrypt subsequent encrypted data.

In a second decryption system embodiment, a uniquely encrypted master key for each individual receiver unit is physically delivered to each user periodically (such as once a month). The key is entered into each receiver unit by a keypad, or the key is embodied in an electronically readable card or device inserted into a suitable port in the receiver unit.

In another embodiment, voice synthesizer 45 is controlled to provide a variety of particular voices. These voices are selected by the user, i.e. to be male/female or other voices, or the system is programmed via microcontroller 20 to select different voices for different types of or categories of information.

The device of FIG. 1 as incorporated in a conventional radio or television receiver uses the antenna 11 of the radio or television receiver. The tuner 12 may be in addition to the conventional radio or television tuner or may be part of the radio or television tuner. The other blocks of FIG. 1 (with the exception of amplifier 36 and loud speaker 38) are unique to this system and are added components to a conventional radio or television receiver.

Another embodiment may encompass all of the elements of the receiver unit except the interface 40 and audio elements 36, 38 in a device located in the trunk of an automobile, similar to CD music systems, with an output mini radio transmitter tuned to an unused FM or AM radio channel. This radio transmitter output would be coupled to the standard automobile radio antenna for outputting of the audio signal to the user.

Another embodiment of the receiver may provide for the reception and storage of the data in a home base unit wherein the received data is stored on disk storage (as discussed above) and the disk is played back on the portable (automobile) unit. A further variant includes a home base unit containing all the features of an automobile unit which can be unplugged from the home base and plugged into an automobile unit for continuing use while the user is in the automobile.

The transmitting portion of the system is illustrated in FIG. 2 indicating the following steps and elements. The data generating portion 51 contains the usual human (non-electronic) steps of news and information gathering 55 and the news and information classification and formatting 56. These are the data gathering and organizing steps typical of any news service that provides a data base. For the audio transmission, this news and other audio information is input into the electronics portions, by speaking into a microphone (not shown), the output of which is provided to a convertor 60 which converts the analog audio signals to a digitized audio data form. The digitized audio data is compressed for memory and bandwidth considerations in compression circuitry 57. The compressed digitized audio is encrypted in data encryption circuitry 58 according to key distribution instructions from a billing/subscriber unit 59. This billing/subscriber is a human input to the system that determines the decryption key appropriate for an individual subscriber. The encrypted digitized audio data establishes a data base.

When it is advantageous to use originally alphanumeric information, such originally alphanumeric information from news and classification and formatting step 56 is conventionally put into a form for transmission and encrypted by data encryption circuitry 64 which is similar to data encryption circuitry 58. Switch 61 is controlled by an operator to determine whether the system transmits compressed digitized audio or alphanumeric information. The Data from switch 61 is sent by a transmission path such as a dedicated telephone line 63 to a transmission station such as an existing radio and television station 50.

In order to provide the needed quantity of audio data in a reasonable time frame, to conserve bandwidth and save memory space in the receiver, the audio data is passed through a data compression algorithm at the transmitting end, This data compression is included in block 57 in FIG. 2. In addition to data compression, since the transmission facility is not transmitting the information in a "live" fashion as with most broadcasting facilities, the transmission facility can maximize the use of the available bandwidth of transmission or available memory by not only using the above mentioned data compression techniques, but can transmit the data at a rate unrelated to the speed of speech. The speed of transmission of the data can be faster than the "real time" speech when broadcast bandwidth considerations permit. In addition, the speed of transmission can be slower than the "real time" speech if only a narrower broadcast bandwidth is to be used. This variation in transmission speed affects the time required to transmit a given amount of information. The variation in the speed and the amount of speech compression can be dynamic and be a function of the nature of the information being transmitted.

The completed data on line 63 is inserted into the FM subcarrier, Separate Audio Program channel, the active picture or the television Vertical Blanking Interval using a conventional data insertion device 62 for transmission by conventional television or radio transmitter 53 via antenna 54, in addition to conventional audio and video program generation of material from element 52.

Figure 3:
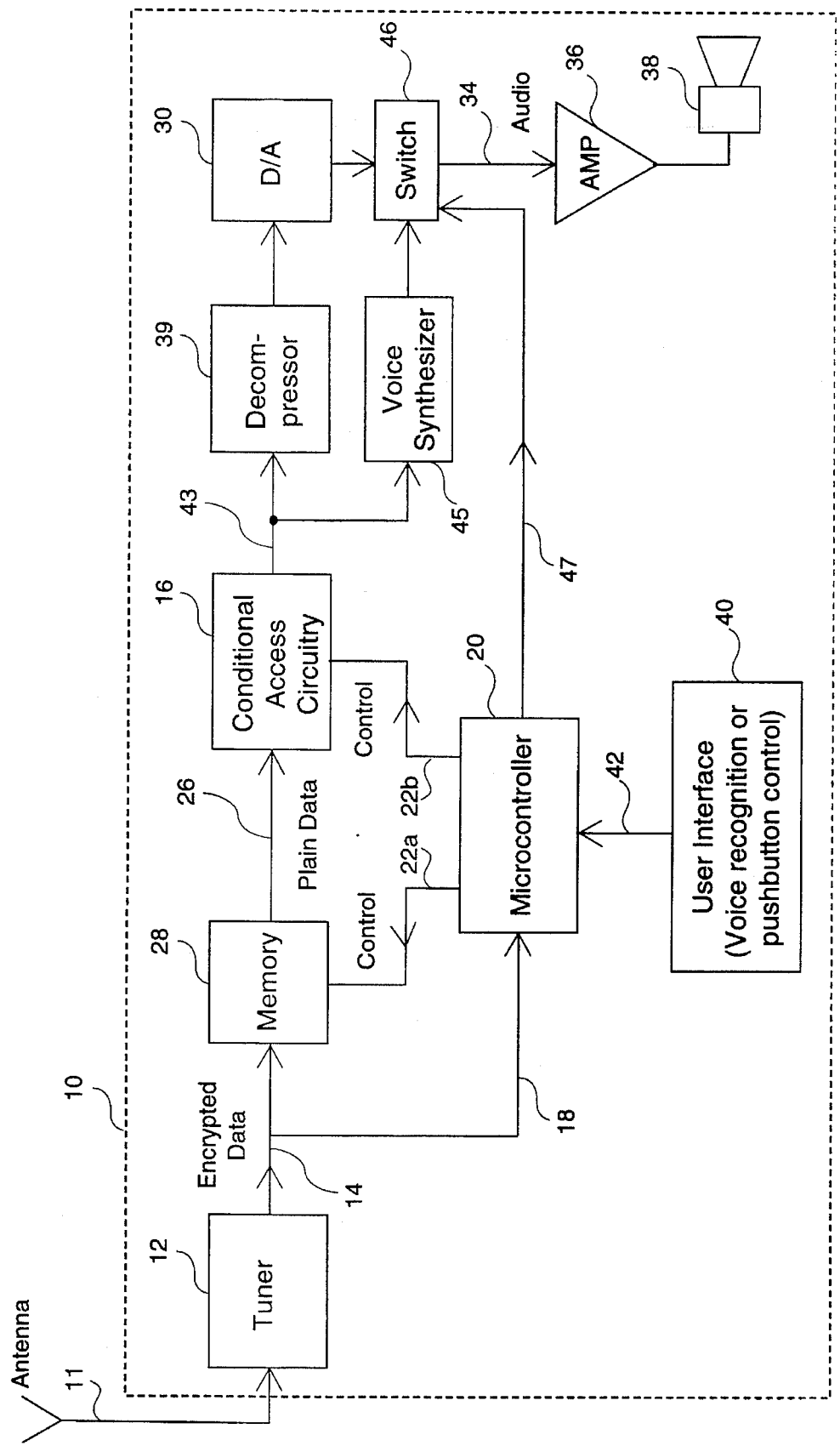
FIG. 3 shows a block diagram of an alternative embodiment of the apparatus of FIG. 1.

In the embodiments of FIGS. 1 and 2 the order of the elements may be varied for particular needs of a system. In an alternative embodiment in FIG. 3 including many elements identical to FIG. 1, memory 28 receives and stores encrypted data on line 14 prior to processing by conditional access circuitry 16.

Figure 4:
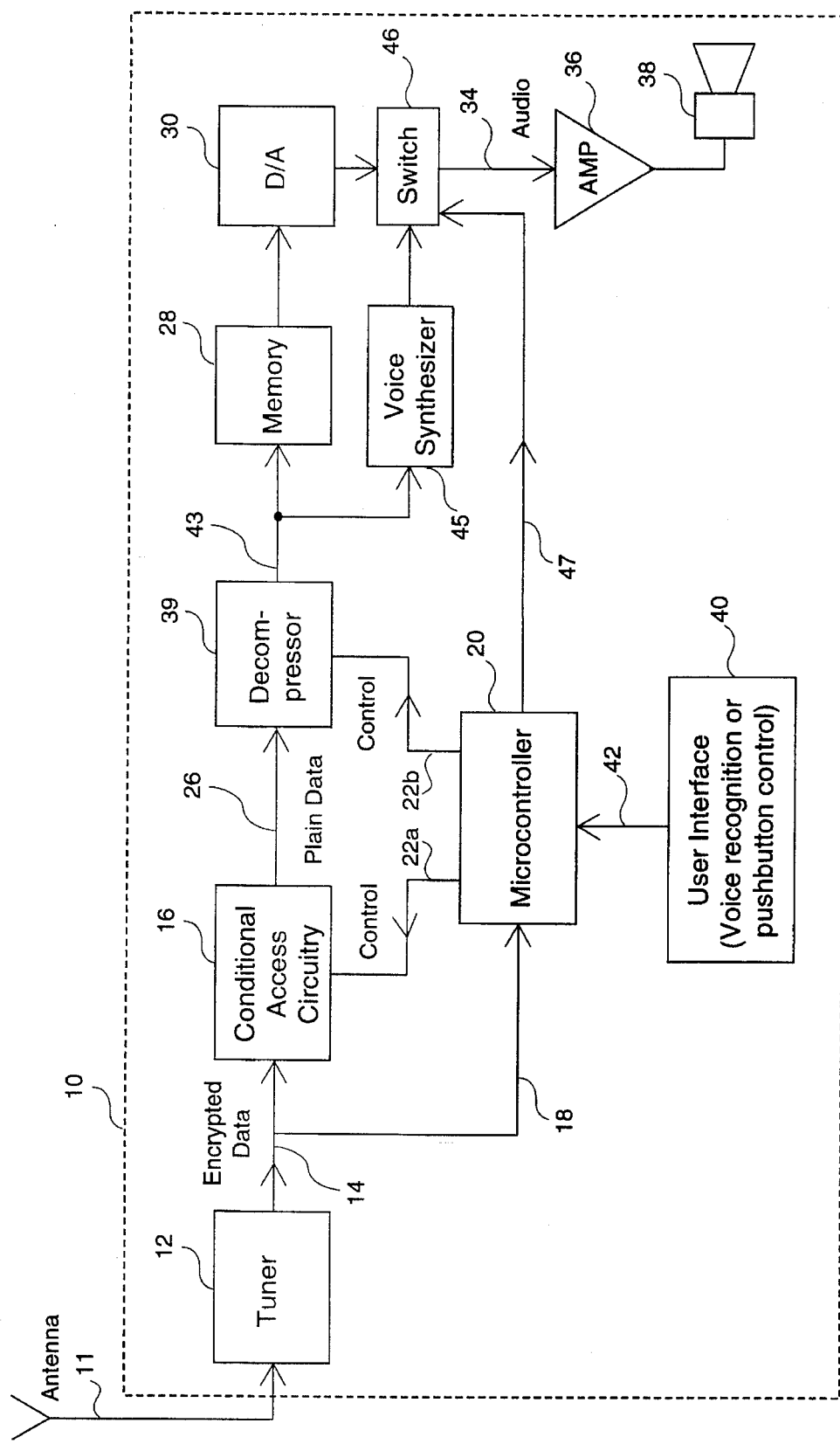
FIG. 4 shows a block diagram of a second alternative embodiment of the apparatus of FIG. 1.

In an alternative embodiment in FIG. 4, decompression circuitry 39 performs its function prior to storage of the digital data in memory 28. This embodiment assumes that there is no need to conserve use of memory 28.

A system for audio information dissemination as described above creates possibilities of uses beyond information transmitted by voice or alphanumeric data. By selectively controlling the compression and data transmission rate the system permits the transmission of music. The transmission of music allows a "Walkman™" type portable receiving device to receive only music. These broadcast transmissions may include e.g. a Top Ten list of rock music for teenagers, or other combinations programmed by the transmission facility. This special portable receiver has all the elements of the system described above except for voice synthesizer 45 and switch 46. The loud speaker 38 is replaced by a headset. User interface 40 includes a push button to select specific musical selections. The conditional access circuitry 16 is programmed to receive only the type of musical selections the user has contracted for. In order to conserve power and space, memory 28 includes only random access memory (RAM) sufficient to store the length of music play required. A separate long life power source is incorporated to keep tuner 12, conditional access circuitry 16, microcontroller 20 and memory 28 active to receive the broadcast music when the user is not using the portable receiver. Decompression circuitry 39, digital to analog converter 30 and audio amplifier 36 are powered in addition to the above noted elements (12, 16, 28 and 20) only when the user is listening to the music. Tuner 12 is adapted to one of the transmission channels described above; the SAP, the Vertical Blanking Interval of a television channels an active picture television channel or an FM Subcarrier transmission.

For a broadcast medium, in addition to the FM subcarriers Separate Audio Program channel, the television active picture area or the television Vertical Blanking Interval means of transmitting the data, a dedicated radio channel can be used in accordance with the invention. An example of such a dedicated radio channel is dedicated cellular telephone channel. Cellular telephone systems have a central transmitter in each cell that accommodate thousands of telephone calls within its cello One of the channels in each cell of such a system may be dedicated to transmission of data dedicated receivers. An addition dedicated channel may include a satellite transmission of the data.

Since some subscribers may not have their receiver units on when certain data is transmitted, it is apparent that the broadcasting facility 50, 51 will update the data base from time to time even if no new information has been recently generated at step 55. The data for a particular news item may include a date time code to indicate to the user the currency of the information.

While preferred forms of the invention have been shown in the drawings and described, since variations in the preferred form will be apparent to those skilled in the art, the invention should not construed as limited to the specific form shown and described, but instead is as set forth in the following claims.

I claim:

1. A receiver to receive data in a transmitted signal comprising:
   a tuner for extracting said data from said transmitted signal;
   a memory coupled to said tuner for storing said extracted data;
   a user interface for providing a set of menus relating to said data, and for indicating selections from said set of menus;
   a controller coupled to said memory and to said user interface for selecting data from said memory in response to said indicated selections and providing said selected data; and
   a speech producing portion for converting said selected data to an analog signal.

2. The device of claim 1, wherein said data includes news, stock information, and music.

3. The device of claim 1, wherein said tuner is an FM radio station subcarrier tuner.

4. The device of claim 1, wherein said tuner extracts said data from a transmitted television signal carrier.

5. The device of claim 4, wherein said tuner extracts data from a blanking interval of said transmitted television signal carrier.

6. The device of claim 4, wherein said tuner extracts data from an active picture area of said transmitted television signal carrier.

7. The device of claim 4, wherein said tuner is a separate audio programming channel tuner.

8. The device of claim 1, wherein said tuner is tuned to a cellular telephone channel.

9. The device of claim 1, wherein said tuner is tuned to a satellite channel.

10. The device of claim 1, wherein data stored in said memory comprises an entire database.

11. The device of claim 10, said data including elements for designating a hierarchy for said database.

12. The device of claim 1, wherein said memory comprises volatile integrated circuit memory and non-volatile storage.

13. The device of claim 12, wherein said non-volatile storage is selected from the group consisting of a magnetic tape, a magneto-optical disk, a magnetic disk, an optical disk, and a non-volatile integrated circuit memory.

14. The device of claim 1, wherein said extracted data is digitized audio data.

15. The device of claim 14, wherein said digitized audio data is compressed.

16. The device of claim 14, wherein said digitized audio data is encrypted.

17. The device of claim 1, wherein said extracted data is alphanumeric data.

18. The device of claim 17, wherein said speech-producing portion includes a speech synthesizer for converting said alphanumeric data to said analog signal.

19. The device of claim 1, wherein said extracted data is data that has been digitized, encrypted and compressed, and further comprising a decryptor coupled to said controller and to said memory for providing access to and decrypting said extracted data.

20. The device of claim 19, wherein said decryptor is enabled by a key device connected to said decryptor.

21. The device of claim 19, wherein said decryptor is enabled by a key received by said tuner.

22. The device of claim 1, wherein said device includes decompression circuitry coupled to said memory to decompress said extracted data.

23. The device of claim 1, wherein said user interface is voice activated.

24. The device of claim 1, wherein said user interface includes:
   a manual input device on a steering wheel; and
   a link from said manual input device to said controller.

25. The device of claim 1, wherein said user interface includes a control for determining a speed at which said speech producing portion outputs said analog signal.

26. The device of claim 1, wherein said tuner includes a channel skip tuning portion.

27. The device of claim 1, said speech-producing portion comprising:
   a convertor for converting said selected data to an analog signal; and
   an amplifier for amplifying said analog signal.

28. The device of claim 1, said receiving system being adapted to connection to at least an antenna of an automobile radio set.

29. The device of claim 1, said controller storing said extracted data in a an integrated circuit portion of said memory up to the capacity of said integrated circuit portion before transferring said extracted data to a storage portion of said memory, wherein said storage portion is selected from the group consisting of disk medium, tape medium and a non-volatile integrated circuit memory.

30. The device of claim 29, wherein said tape medium is a digital audio tape.

31. The device of claim 29, wherein said disk medium is a magnetic disk.

32. The device of claim 29, wherein said disk medium is a magnetic-optical disk.

33. The method of claim 29, wherein said disk medium is an optical disk.

34. A receiver for receiving a transmitted signal including compressed data, comprising:
   a tuner connected to receive said transmitted signal at an input terminal thereof and having an output terminal;
   a decryptor having an input connected to said output terminal of said tuner, and having an output terminal;
   a user interface device connected to said decryptor, said interface comprising a set of menus relating to said data, and for indicating selections from said set of menus;
   a memory having an input port connected to said output terminal of said decryptor, and having an output port;
   a decompression circuit having an input terminal connected to said output port of said memory and having an output terminal; and
   a converter having an input terminal connected to said output terminal of said decompression circuit, and having an output terminal for providing an analog signal.

35. The receiver of claim 34, wherein said output terminal for providing an analog signal is a headset connection.

36. The receiver of claim 34, further comprising:
   a voice synthesizer circuit having an input terminal connected to said output port of said memory and having an output terminal; and
   a switch having two input terminals connected respectively to said output terminals of said voice synthesizer and of said converter, said switch having an output terminal for providing an analog signal, and
   further having a control terminal connected to said decryptor.

37. The receiver of claim 34, wherein said decryptor includes:
   access circuitry connected between said output terminal of said tuner and said input port of said memory, and having a control terminal; and
   a microcontroller connected between said control terminal of said access circuitry and said user interface.

38. The receiver of claim 34, wherein said receiver is a portable receiver.

39. The receiver of claim 34, wherein said receiver is programmed for receipt of musical selections.

40. A method for receipt of transmitted digital compressed data, comprising the steps of:
   tuning to a broadcast signal including said digitized data;
   extracting said digital data from said broadcast signal;
   decrypting said extracted digital data;
   storing said decrypted data;
   accessing portions of said stored data in response to user commands;
   decompressing said accessed portions of said data; and
   converting said decompressed data to an analog signal.

41. A system for transmission of audio data comprising:
   a converter for converting audio information to digital data;
   a compressor for compressing said audio data;
   an encryptor for encrypting said digital audio data;
   an inserter for inserting said compressed encrypted digital data into a transmission channel signal;
   a tuner for extracting said digital data from said transmission signal;
   a memory for storing said extracted data;
   a user interface for providing a set of menus to a user describing said stored data;
   a controller for selecting data from said memory in response to selections from said menus;
   a decryptor for decrypting selected data;
   a decompressor for decompressing said selected data;
   a converter for converting said digital data to analog audio data.

42. A method for transmission of audio data, comprising the steps of:
   converting said data to digitized data;
   arranging said data into specific areas according to a menu list;
   compressing said digitized data;
   encrypting said digitized data; and
   transmitting said compressed and encrypted digitized data.

43. The method of claim 42, wherein a speed of transmission of said data is varied thereby to efficiently use available bandwidth of said transmitted signal.

44. The method of claim 42, further comprising the steps of:
   providing digitized alphanumeric data;
   encrypting said alphanumeric data;
   transmitting said encrypted alphanumeric data; and
   selecting said compressed data or said encrypted alphanumeric data.

45. A method for transmitting audio data, comprising the steps of:
   converting said audio data to digitized data;
   forming menus for selection of particular element of said data base;
   compressing said digitized audio data;
   encrypting said compressed data;
   transmitting a signal including said encrypted and compressed data;
   extracting said data from said transmitted signal;
   storing said extracted data;
   providing a set of menus for accessing said data;
   selecting items from said set of menus;
   providing portions of said stored data in response to said selection of items;
   decrypting said provided portions of said stored data;
   decompressing said decrypted data; and
   converting said decompressed data to an analog signal.

46. A method for transmitting alphanumeric data, comprising the steps of:
   converting said alphanumeric data to digitized data;
   forming menus for selection of particular segments of said data; encrypting said digitized data;
   transmitting said encrypted data;
   extracting said data from said transmitted signal;
   storing said extracted data;
   providing a set of menus for accessing said data;
   selecting items from said set of menus;
   providing portions of said stored data in response to said selection of items;
   decrypting said provided portions of said stored data; and
   converting said decrypted portions to analog signal.

47. A system for providing compressed digital audio data to a transmitter, comprising:
   an analog to digital converter having an input terminal connected to receive an audio signal and having an output terminal; and
   menu selection, data compression and encryption circuitry having an input terminal connected to said output terminal of said converter, and having an output terminal connection to said transmitter.

* * * * *